(12) United States Patent
Kimelman et al.

(10) Patent No.: US 7,080,178 B2
(45) Date of Patent: Jul. 18, 2006

(54) INTERRUPT PRE-EMPTION AND ORDERING WITHIN A DATA PROCESSING SYSTEM

(75) Inventors: Paul Kimelman, Alamo, CA (US); Ian Field, Walnut Creek, CA (US)

(73) Assignee: ARM Limited, Cambridge (GB)

( * ) Notice: Subject to any disclaimer, the term of this patent is extended or adjusted under 35 U.S.C. 154(b) by 103 days.

(21) Appl. No.: 10/773,452

(22) Filed: Feb. 9, 2004

(65) Prior Publication Data

US 2005/0177668 A1    Aug. 11, 2005

(51) Int. Cl.
G06F 13/24    (2006.01)
G06F 13/26    (2006.01)

(52) U.S. Cl. ..................................... 710/264; 710/263

(58) Field of Classification Search ................. 710/264
See application file for complete search history.

(56) References Cited

U.S. PATENT DOCUMENTS

| | | | | |
|---|---|---|---|---|
| 4,075,679 A | * | 2/1978 | Christopher et al. | 708/130 |
| 6,295,553 B1 | * | 9/2001 | Gilbertson et al. | 709/207 |
| 6,539,448 B1 | * | 3/2003 | Deng | 710/260 |
| 6,578,064 B1 | * | 6/2003 | Saito et al. | 718/103 |
| 6,618,780 B1 | * | 9/2003 | Popat | 710/264 |

* cited by examiner

*Primary Examiner*—Jeremy S. Cerullo
(74) *Attorney, Agent, or Firm*—Nixon & Vanderhye P.C.

(57) ABSTRACT

A data processing system nested interrupt controller 24 responsive to priority level values 28, 30 associated with respective interrupt handling programs to control the execution of those interrupt handling programs. The priority level values have a first portion 28 which controls whether or not a pending interrupt handling program will pre-empt an already active interrupt handling program and a second portion 30 which controls which of a plurality of pending interrupt handling programs will be executed next when they share the same value for the first portion of their priority level value.

12 Claims, 10 Drawing Sheets

Main Flow

Return From Interrupt Flow

INTERRUPT PRE-EMPTION AND ORDERING WITHIN A DATA PROCESSING SYSTEM

BACKGROUND OF THE INVENTION

1. Field of the Invention

This invention relates to data processing systems. More particularly this invention relates to data processing systems supporting nested interrupts and the control of pre-emption and interrupt ordering within such systems.

2. Description of the Prior Art

It is known to provide data processing systems with interrupt handling mechanisms. Typically, when an interrupt signal arises, this triggers the data processing system to change the program flow to start executing an interrupt handling program for dealing with the situation signalled by the interrupt signal. This type of data processing system is well-suited for use in embedded and deeply embedded data processing systems, particularly where real time or near real time operation is desired. Within interrupt driven data processing systems, it is highly desirable to be able to deal with more than one interrupt at a time. In many systems the interrupt latency, or more importantly the time from an interrupt occurring until the code for dealing with that interrupt starts to execute, is a critical performance limiting parameter. The ability to nest interrupts allows a newly arising interrupt with a suitably high priority to pre-empt an existing interrupt handling program of a lower priority.

A problem which can arise within such nested interrupt handling systems is that when a sequence of interrupt events occur which respectively pre-empt one another, a disadvantageous amount of time can be consumed in switching between the associated interrupt handling programs concerned. Measures which can improve the processing efficiency of interrupt driven data processing systems are strongly advantageous.

SUMMARY OF THE INVENTION

Viewed from one aspect the present invention provides an apparatus for processing data, said apparatus comprising:

processing logic operable to perform processing operations under control of program instructions and subject to interruption by a plurality of interrupt handling programs; and a nested interrupt controller operable to control execution of said plurality of interrupt handling programs in response to priority level values associated with respective ones of said plurality of interrupt handling programs, each priority level value being divided into a first portion and a second portion; wherein said nested interrupt controller is operative to compare a first portion of a priority level value associated with a pending interrupt handling program with a corresponding first portion of a priority level associated with an active interrupt handling program to determine whether said pending interrupt handling program should pre-empt said active interrupt handling program or wait to be activated; and said nested interrupt controller is operative to order for activation a plurality of pending interrupt handling programs based upon a comparison of respective first portions of priority level values associated with said plurality of pending interrupt handling programs and then for any pending interrupt handling programs having equal respective first portions upon a comparison of respective second portions of said priority level values.

The present technique recognises that whilst some interrupts may have a higher priority than other interrupts, the difference between these priorities is not sufficient to justify the higher priority interrupt pre-empting an already executing interrupt of slightly lower priority. These interrupts may desirably be grouped together within a pre-emption group in which they will not pre-empt one another. However, it is still desirable that when there are multiple pending interrupts from the same pre-emption group, the ordering with which these should then be executed can be selected in dependence upon a more fine grained priority measure than the pre-emption grouping alone. In order to simultaneously address these issues, the present technique provides a priority level value associated with the pending interrupts that has a first portion used to determine whether a pending interrupt will pre-empt an active interrupt and a second portion used to differentiate between pending interrupts having the same value for their first portion when determining which of those pending interrupts should be executed next.

It is convenient that the first portions and the second portions should be contiguous portions of the priority level values. This is particularly useful in allowing a programmable mask value to be used when reading the first portions and the second portions and for dividing the priority level values between these two portions. Whilst in the general case the priority level values will support multiple pre-emption groups and ordering within those groups, it will be appreciated that in some embodiments it may be sufficient to use a single pre-emption group such that no interrupt will pre-empt another interrupt, but use the second portion of the priority level value to define the ordering which pending interrupts should be dealt with when more than one pending interrupt is present.

Viewed from another aspect the present invention provides a method of processing data, said method comprising the steps of:

performing processing operations under control of program instructions, said processing being subject to interruption by a plurality of interrupt handling programs; and controlling nested interrupt execution of said plurality of interrupt handling programs in response to priority level values associated with respective ones of said plurality of interrupt handling programs, each priority level value being divided into a first portion and a second portion; wherein said step of controlling compares a first portion of a priority level value associated with a pending interrupt handling program with a corresponding first portion of a priority level associated with an active interrupt handling program to determine whether said pending interrupt handling program should pre-empt said active interrupt handling program or wait to be activated; and said step of controlling orders for activation a plurality of pending interrupt handling programs based upon a comparison of respective first portions of priority level values associated with said plurality of pending interrupt handling programs and then for any pending interrupt handling programs having equal respective first portions upon a comparison of respective second portions of said priority level values.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
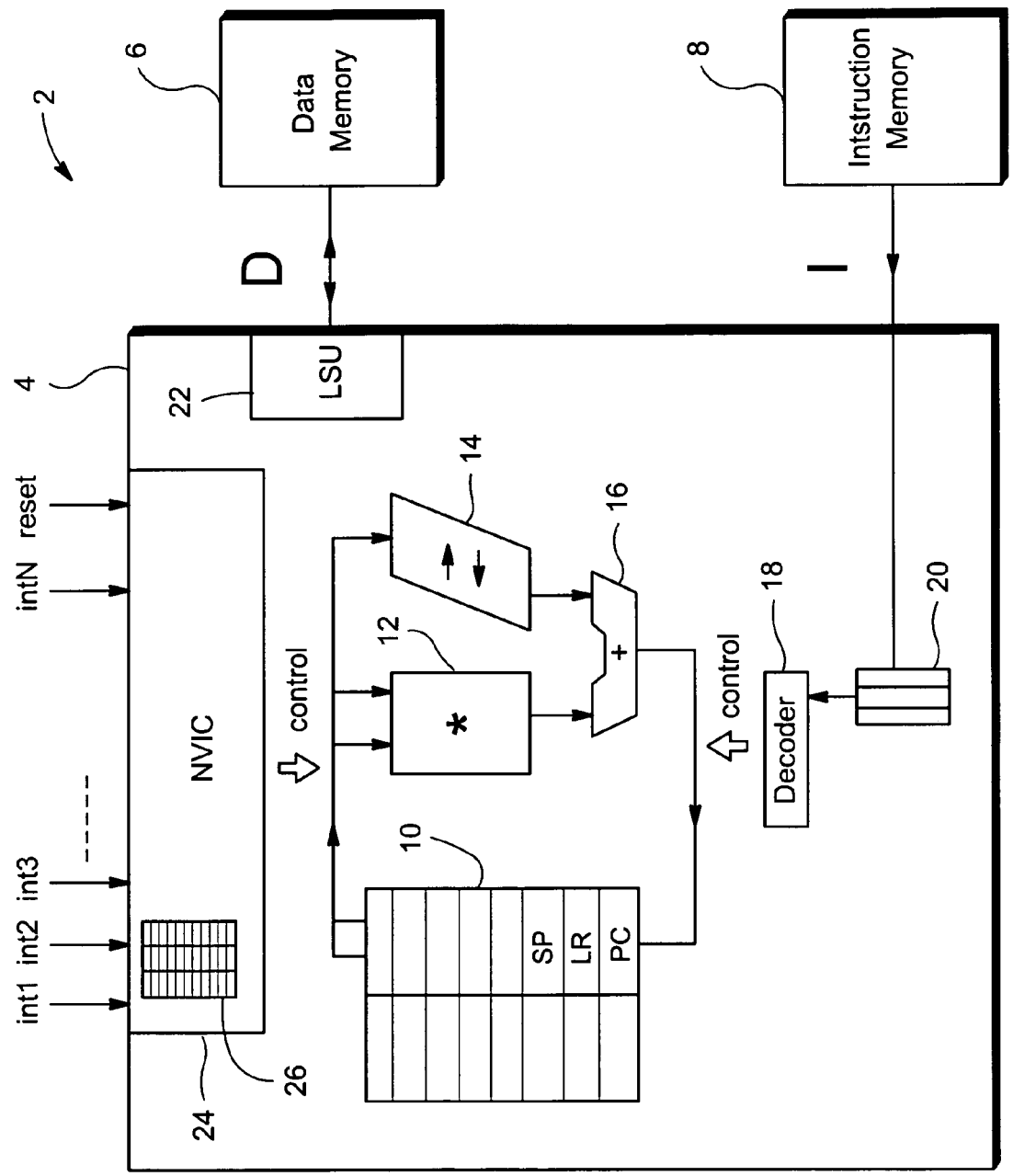
FIG. 1 schematically illustrates a data processing system including a nested vector interrupt controller.

FIG. 1 schematically illustrates a data processing system 2 including a processor core 4 coupled to a data memory 6 and an instruction memory 8. Within a deeply embedded interrupt driven system, the data memory 6 and the instruction memory 8 may typically be separately provided in the form of RAM and flash memories, respectively.

The processor core 4 includes a register bank 10, a multiplier 12, a shifter 14 and an adder 16 which together forms processing logic operable to perform data processing operations under control of control signals generated by an instruction decoder 18. The instruction decoder 18 is responsive to an instruction pipeline 20, which in the example illustrated is a three stage instruction pipeline with the instruction currently at the execute stage being decoded by the instruction decoder 18 and used to generate appropriate control signals for the processing logic 10, 12, 14 and 16.

A load store unit 22 in the processor core 4 serves to handle the reading and writing of data values to and from the data memory 6. Such a load store unit 22 can include a write buffer and a wide read buffer as appropriate.

The processor core 4 also includes a nested vector interrupt controller 24 which is responsive to N separate interrupt signals as well as an external reset signal. The nested vector interrupt controller 24 may also be subject to internal interrupt-type signals, such as fault and abort signals. A separate non-maskable interrupt signal (not illustrated) may also be supplied to the nested vector interrupt controller. The nested vector interrupt controller 24 is responsive to the received interrupt signals to generate control signals, as will be described further below, which serve to control interrupt processing by the processor core 4. In particular, a received interrupt signal may or may not pre-empt existing user program type processing or existing interrupt processing depending upon a priority level value associated with that interrupt. A control table 26 is provided within the nested vector interrupt controller 24 and serves to track which interrupts are pending and which are active and to store programmable priority level values.

Figure 2:
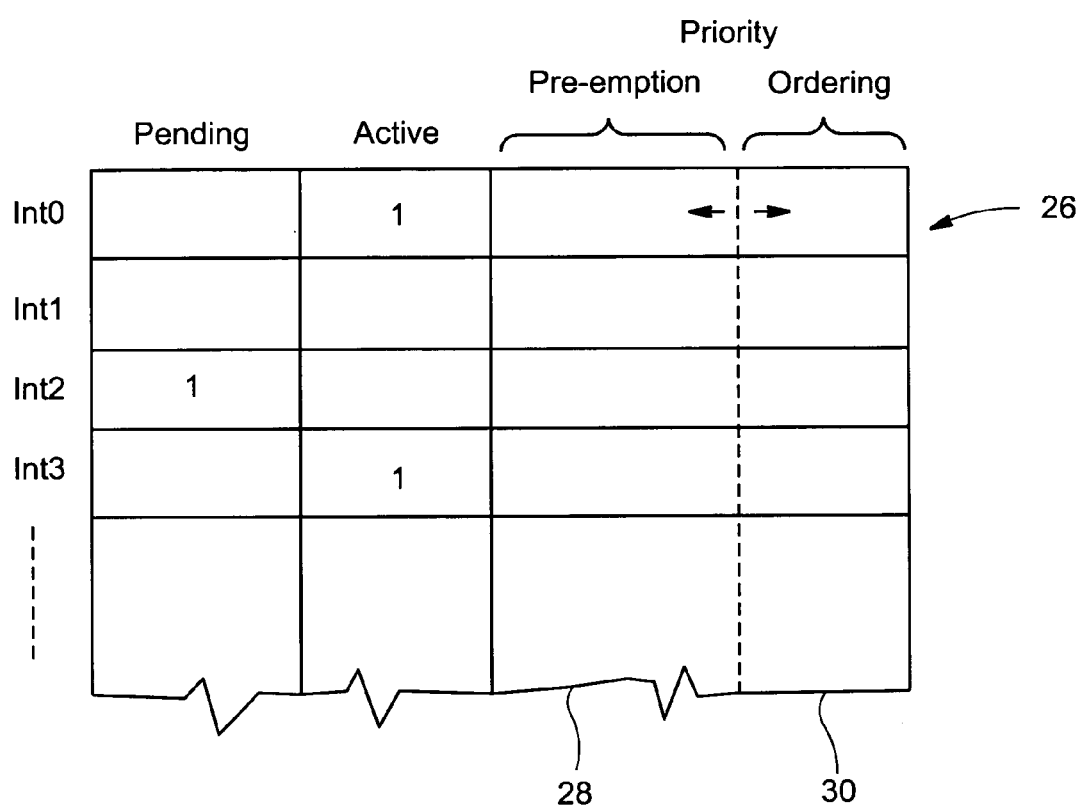
FIG. 2 schematically illustrates a control table used within a nested vector interrupt controller.

FIG. 2 schematically illustrates the control table 26 of the nested vector interrupt controller 24. For each interrupt signal there is recorded respective status flags indicating whether an interrupt is pending or is currently active for that interrupt signal. A pending interrupt is one where the interrupt signal has been detected by the nested vector interrupt controller 24 but has not yet been actioned, i.e. the associated interrupt handling program has not yet started execution. An active interrupt is one in which the interrupt handling program has started execution, although it may not be currently executing as it may itself have been pre-empted by a higher priority interrupt.

In the example illustrated, it will be seen that currently interrupts Int0 and Int3 are active. Only one of these will currently be executing with the other having been pre-empted. The currently executing interrupt handling program will only have been able to pre-empt the earlier activated interrupt handling program if it has a higher priority. The interrupt Int2 is pending, but not yet activated. This implies that the interrupt Int2 has a lower or equal priority to the interrupt handling programs which are currently executing and so is not able to pre-empt these existing active interrupt handling programs.

FIG. 2 shows that the priority level value associated with each interrupt is separated into a first portion 28 and a second portion 30. The boundary between these two portions is variable for the system as a whole. The splitting between the two portions may be effectively performed by a programmable mask value. The first portion 28 is a pre-emption grouping value, which serves to control which interrupts pre-empt other interrupts. Interrupts sharing a common first portion 28 will not pre-empt each other. Interrupts having a first portion 28 corresponding to a higher priority than the existing active interrupt will pre-empt that existing active interrupt when they become pending. Conversely, if the first portion of a pending interrupt is lower than the first portion of the currently active interrupt, then it will not pre-empt and will not start execution until that high priority active interrupt has completed its processing.

The second portion 30 of the priority level value serves to control the relative ordering of execution within interrupts from a common pre-emption group. This has effect when more than one interrupt from the same pre-emption group is pending. In this case, the order of execution of these interrupts from the same pre-emption group is controlled by which has the highest priority indicated by the second portion 30. This splitting of the priority level value into a first portion 28 which controls pre-emption and a second portion 30 which controls relative ordering within pre-emption groups, provides a fine grained and sophisticated level of control of the pre-emption behaviour. A particular interrupt may not have a high enough priority to justify the penalty associated with pre-emption in terms of state saving and restoring, but nevertheless be sufficiently high priority to be executed ahead of existing other pending interrupts from its same pre-emption group.

The priority level values stored within the control table 26 may be dynamically altered under program control. The control table 26 may for example be memory mapped and written to by appropriate software controlled writes to specific memory locations.

As illustrated in FIG. 2, the first portion 28 and the second portion 30 are contiguous and abut within the priority level value for a given interrupt. In the particular example illustrated, the priority level value is a 4-bit value with 3-bits devoted to the first portion 28 and 1-bit devoted to the second portion 30. This arrangement would provide eight levels of pre-emption grouping and two levels of relative ordering within pre-emption groups. Interrupts having completely identical priority level values may be processed in their interrupt number order or the order in which they arose.

As previously mentioned, the division between the first portion 28 and the second portion 30 may be programmably set to provide different levels of granularity at the pre-emption group level and the ordering level. At one extreme, it is possible that only a single pre-emption group is provided with all 4-bits of the priority level value being dedicated to specifying a relative ordering within the interrupts, none of which are able to pre-empt one another.

Figure 3:
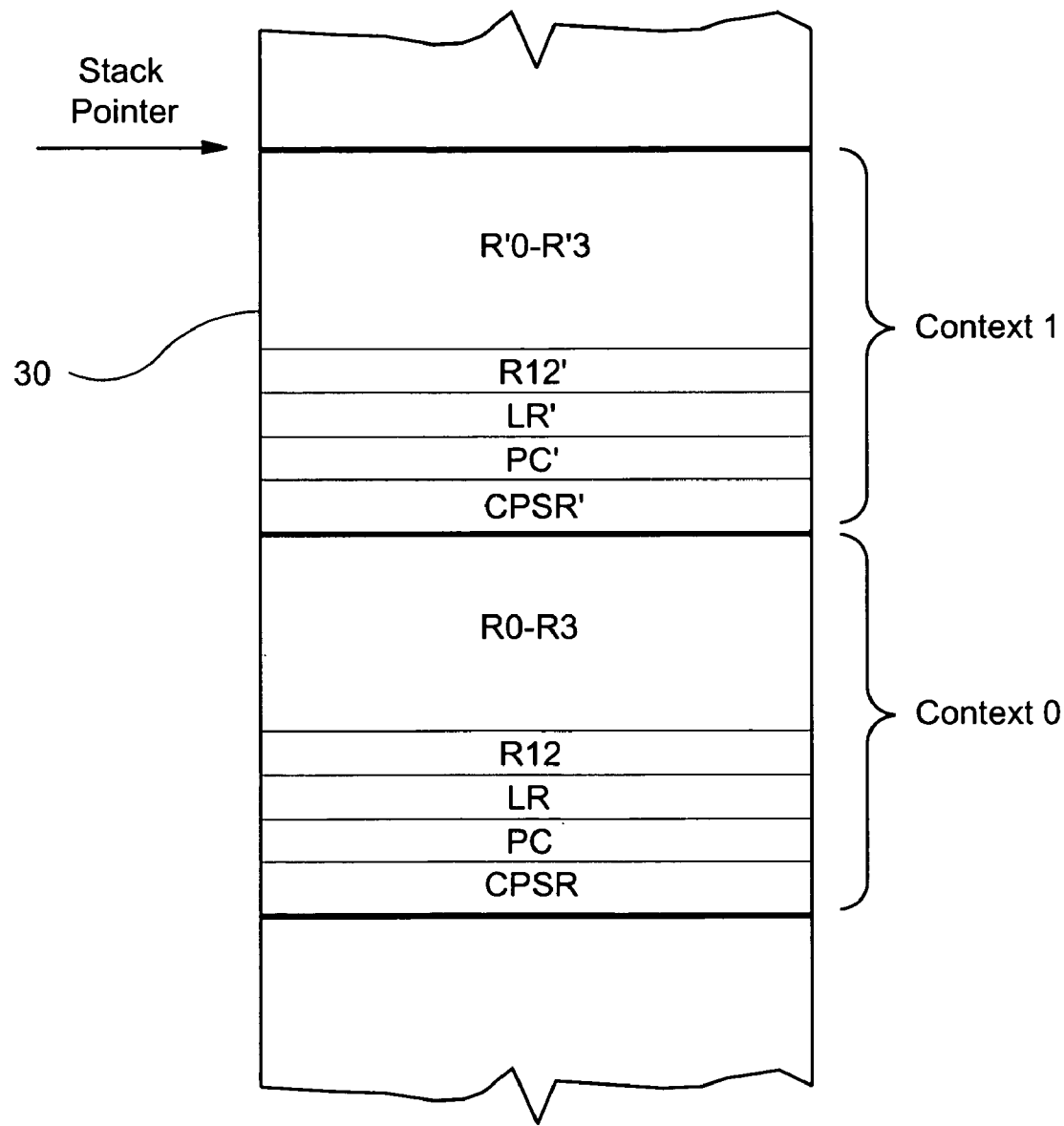
FIG. 3 schematically illustrates a stack memory containing multiple sets of state data.

FIG. 3 schematically illustrates a stack data store in the form of a stack memory 30 which is a region within the data memory 6. In accord with the normal way of controlling a stack memory 30, a stack pointer value is maintained indicating a top-of-stack position from which data may be read and to which data may be written. As context/state data needs to be saved, it is written to the stack memory 30 in a predetermined order. In the example illustrated, the state data saved includes a processor status register value CPSR, a program counter value PC, a link register value LR, a scratch register value R12 and four general purpose processing register values R0–R3. As interrupts are nested and accordingly multiple levels of context data need to be saved, then further contexts are saved to the stack memory 30. In the example of FIG. 3, the first state data saved related to context 0. The interrupt which triggered this state data relating to context 0 to be saved was then itself pre-empted and resulted in state data corresponding to context 1 of the partially completed interrupt handling program to be saved to the stack memory 30. In this way, state data can be wound onto and wound off the stack memory 30 as the degree of nesting increases and decreases among the interrupts. It is normal for software to be responsible for saving register values, such as a R12 and R0–R3. Having hardware perform this save increases the processing savings associated with the tail chaining technique. Furthermore, the software for the interrupt processing is rendered closer to normal software as opposed to special interrupt handling software.

Figure 4:
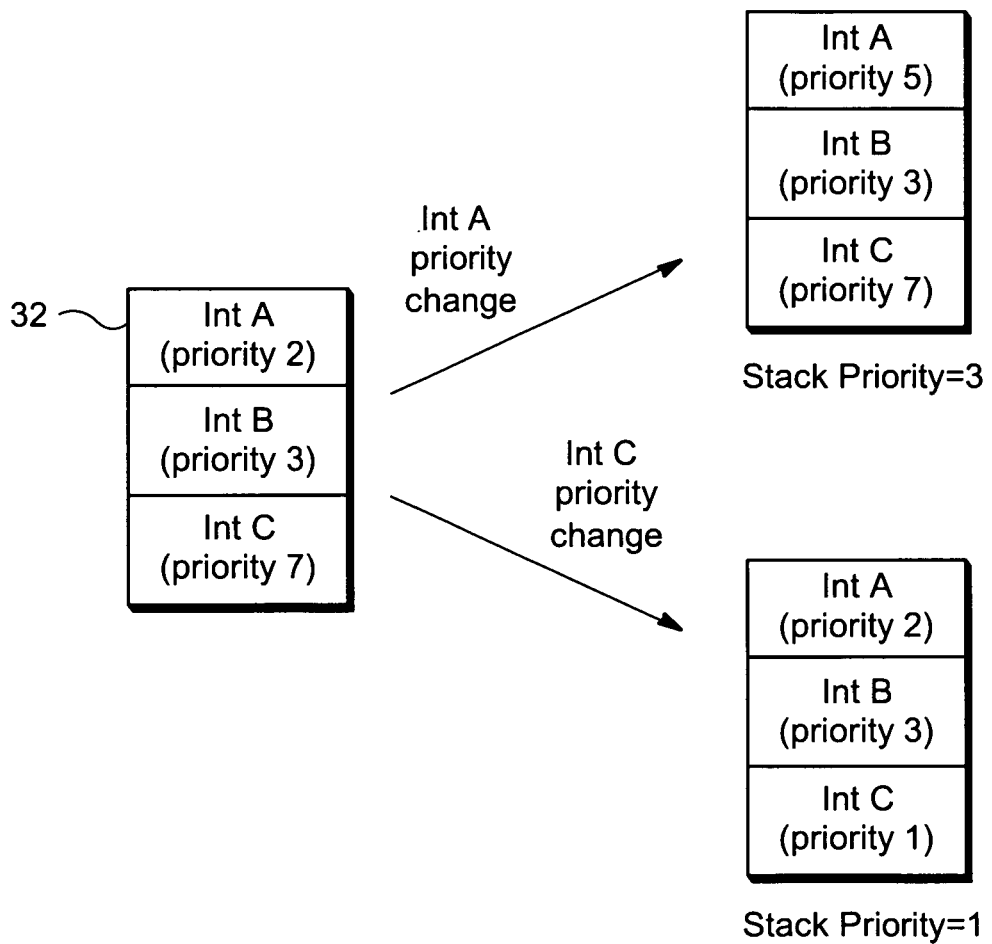
FIG. 4 schematically illustrates two example situations in which priority inversions can arise within nested interrupts.

FIG. 4 schematically illustrates a problem associated with the programmability of the priority level values of FIG. 2. It will be appreciated that different embodiments may not permit the dynamic programming of priority level or may not be sensitive to the problems described below which can result from such dynamic programming. FIG. 4 illustrates a portion of stack memory 32 in which a currently executing active interrupt handling program corresponding to interrupt IntA is executing with nested interrupts beneath it corresponding to interrupts IntB and IntC. As these interrupts have successfully pre-empted one another there is the expected monotonic increase in priority level value associated with the interrupts as one proceeds up the nesting hierarchy. The currently executing active interrupt IntA has the highest priority, namely a priority level value 2.

Illustrated in FIG. 4 are two possible ways in which the priority level values associated with the interrupts currently active may be altered that results in an inappropriate priority inversion within the stack memory 32. In the upper example, the interrupt IntA has its priority level value lowered, such that it is now of a lower priority than the interrupt IntB which it itself pre-empted. This can cause a problem in that should a further interrupt now arise which has a higher priority than interrupt IntA, but a lower priority than interrupt IntB, this may pre-empt the currently executing interrupt IntA in an inappropriate way and disadvantageously delay completion of interrupt IntB. In order to avoid this problem, the nested vector interrupt controller 24, using the priority values stored within the control table 26, determines a priority value corresponding to all of the interrupts currently held within the stack memory, and more particularly the highest of these priority values. Thus, in the upper example discussed above, even though the active interrupt currently executing, namely IntA, has a priority value of 5, the stack will be treated as having a priority value of 3 and accordingly no newly detected interrupt will pre-empt the continuing execution of IntA, and consequently delay execution of IntB, unless it has a higher priority than 3. This ensures that the interrupt processing associated with IntB is not inappropriately delayed.

The lower example in FIG. 4 illustrates how the priority value associated with interrupt IntC can be raised whilst that interrupt has already been pre-empted and is buried within the nested interrupts on the stack. In accordance with the present technique this change in this buried interrupt IntC is reflected in the overall priority level value associated with the stack and accordingly no further pre-emptions will be allowed until the interrupt IntC has been cleared, unless those newly arising interrupts have a priority level value higher than that associated with interrupt IntC.

In the case of a pending interrupt arising with a priority level equal to the highest priority level associated with the stack of currently active interrupt handling programs, then this will not pre-empt.

The examples illustrated in FIG. 4 relate to the prevention of inappropriate pre-emption. It is also possible that the priority levels may be altered such that an interrupt which is currently pending and was being held off from being made active is, as a result of a lower of the priority level of the stack as a whole, made suitable to trigger a pre-emption. Such a pending interrupt may be a newly detected interrupt or a previously detected but as yet not started interrupt.

It will be appreciated that not all embodiments need use the technique whereby the priority level of the stack as a whole is compared with that of potentially pre-empting interrupt to determine if a pre-emption should take place.

The alteration of the priority level values discussed above may be made as a way of controlling the amount of memory space consumed by the stack memory 30. As the stack memory resources are used up, priority levels associated with the nested active interrupts can be increased to tend to prevent further pre-emption which would require further stack memory resources. In this way, a stack overflow may be avoided. A particularly preferred control method may serve to hold the amount of stack memory used to three quarters of its capacity by promoting the priority levels associated with active interrupts. Leaving one quarter of the stack memory available for additional pre-emption ensures that interrupt handling programs of the highest priority are able to pre-empt as space will be available on the stack memory.

Figure 5:
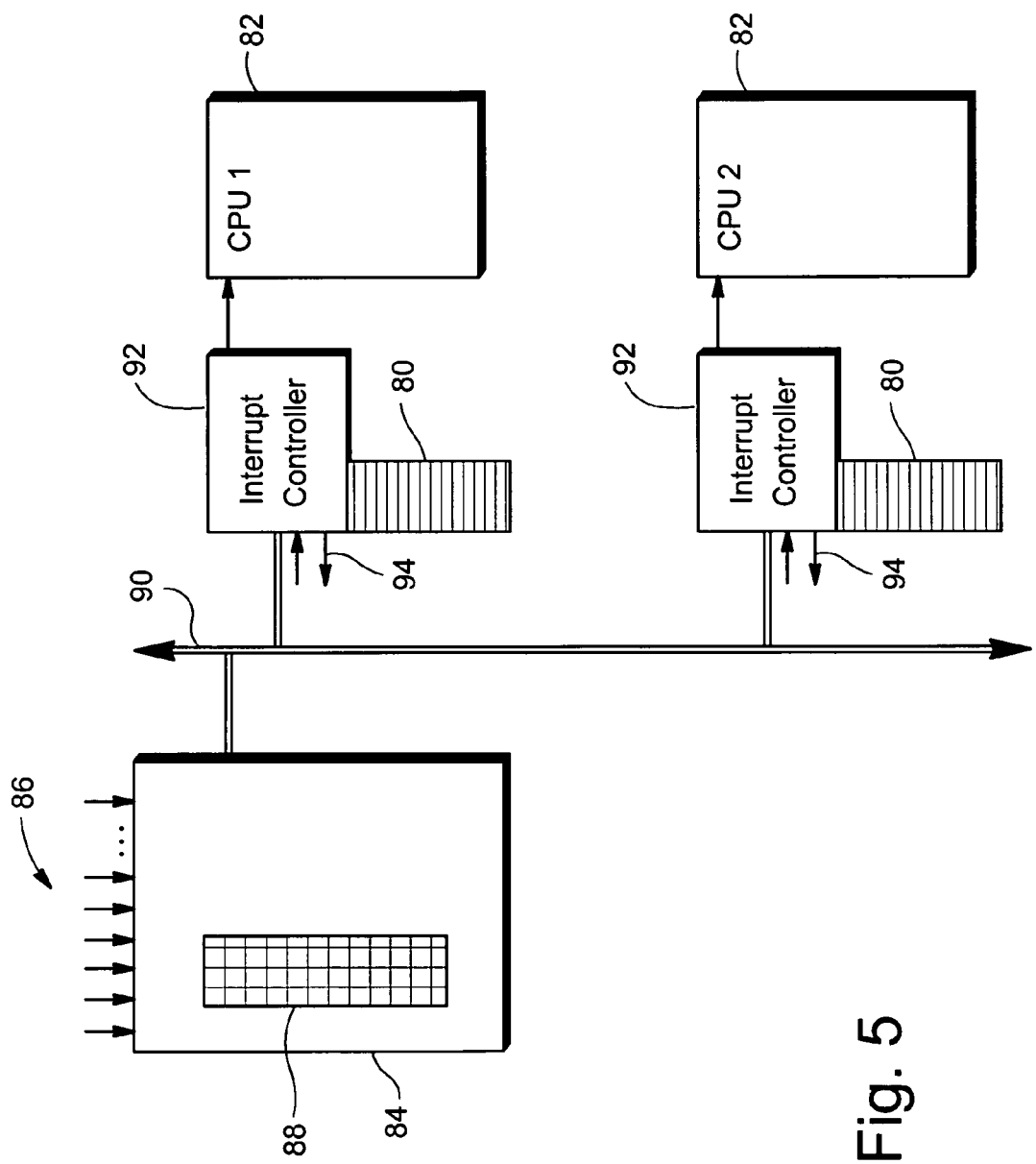
FIG. 5 schematically illustrates a multiprocessor system employing some of the present techniques.

The technique of promoting priority level values may also be employed within a multiprocessor system, as schematically illustrated in FIG. 5, in which a hardware stack of active interrupts 80 is provided for each processor 82. An interrupt distributor 84 is responsive to an array of interrupt signals 86 which can pend one another in accordance with a priority hierarchy programmed within a table 88. The table 88 stores data for each interrupt indicating a priority level and to which processor(s) 82 it may be issued. The interrupt distributor 84 communicates via a distribution bus 90 with interrupt controllers 92 associated with each processor 82.

The interrupt controllers 92 pass signals 94 to the interrupt distributor 84 indicating their current highest priority active interrupt. In this environment, should a hardware stack 80 become full or nearly full, then the priority level values of the interrupts represented within that stack may be effectively increased so as to prevent further pre-emption and an overflow of the hardware stack resources which are provided. This boost of the priority level is communicated by the signal(s) 94.

Figure 6:
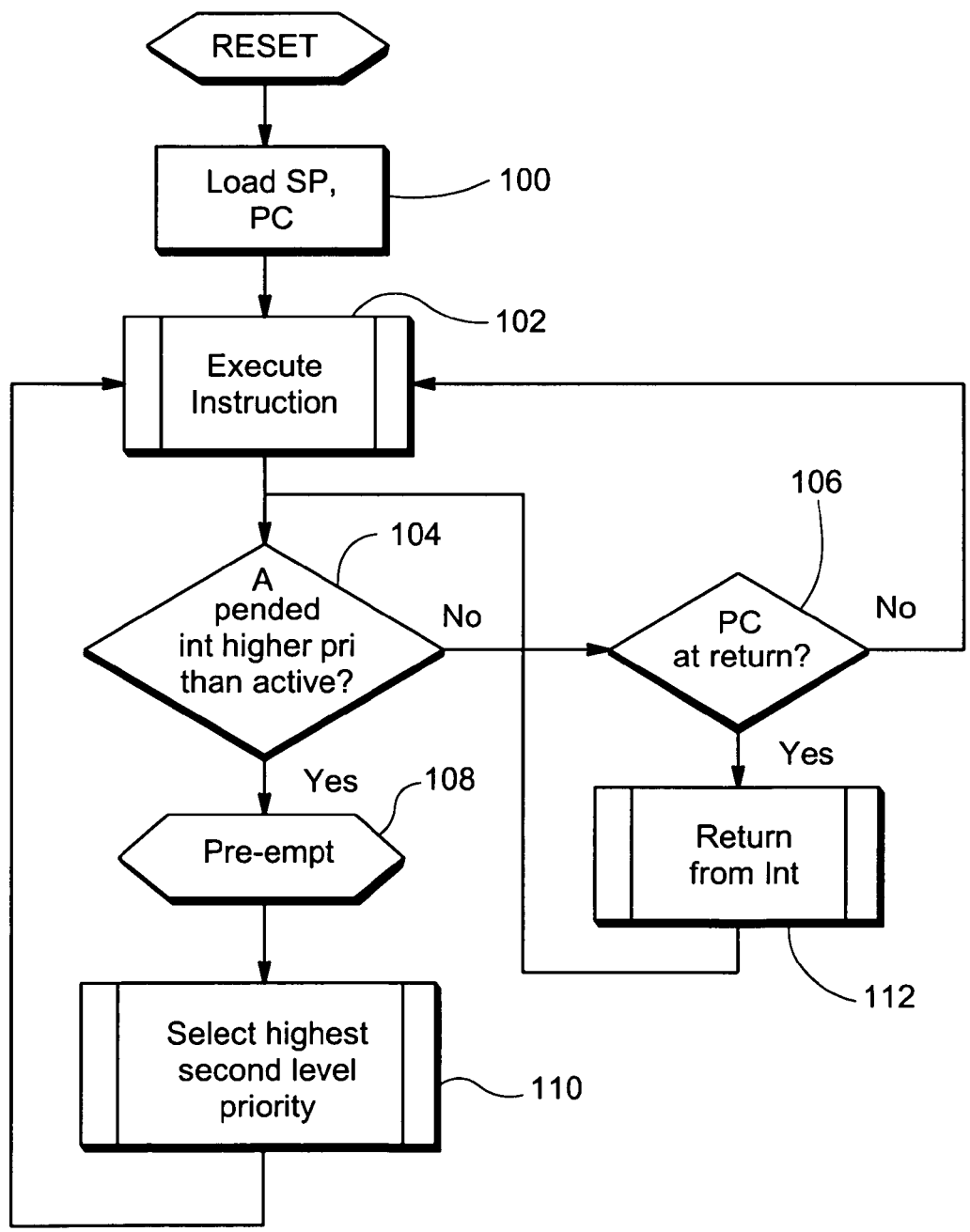
FIG. 6 is a flow diagram schematically illustrating the main control flow for interrupt driven processing within the system of FIG. 1.

FIG. 6 schematically illustrates the main interrupt control flow. When the system emerges from reset, a reset-handling hardware controls reset processing at step 100. Upon exit from the reset handling, a normal user program is started and execution of instructions proceeds at step 102. During this instruction execution, step 104 serves to detect whether there are any pending interrupts that have been detected by the nested vector interrupt controller 24 and marked as pending within the control table 26 that have a higher priority than any existing interrupt processing which is taking place. If no such pending interrupts with a higher priority are present, then processing proceeds to step 106 at which a check is made to see if the program counter value is at a return address corresponding to a predetermined special purpose return address, such as a top of memory location. If such a return address is not detected, then processing returns to step 102 for execution of the next instruction. Alternatively, a special return from interrupt instruction could be placed at the end of the interrupt handling program.

If the determination at step 104 was that there is a pending interrupt with a higher priority than the current processing, whether that be an interrupt itself or the user processing, then step 108 serves to trigger a pre-emption operation as will be described further below and including the step at 110 of selecting the interrupt having the highest second portion 30 of its priority value, if there is more than one pending interrupt which have equal first portions 28 of their priority value and have both a sufficiently high priority value to have triggered the pre-emption. Step 102 then serves to execute the first instruction of the newly activated interrupt.

If the determination at step 106 was that the program counter had the predetermined address value indicating an end of interrupt processing, then step 112 serves to perform a return from interrupt operation as will be described further below before processing is returned to step 104.

Figure 7:
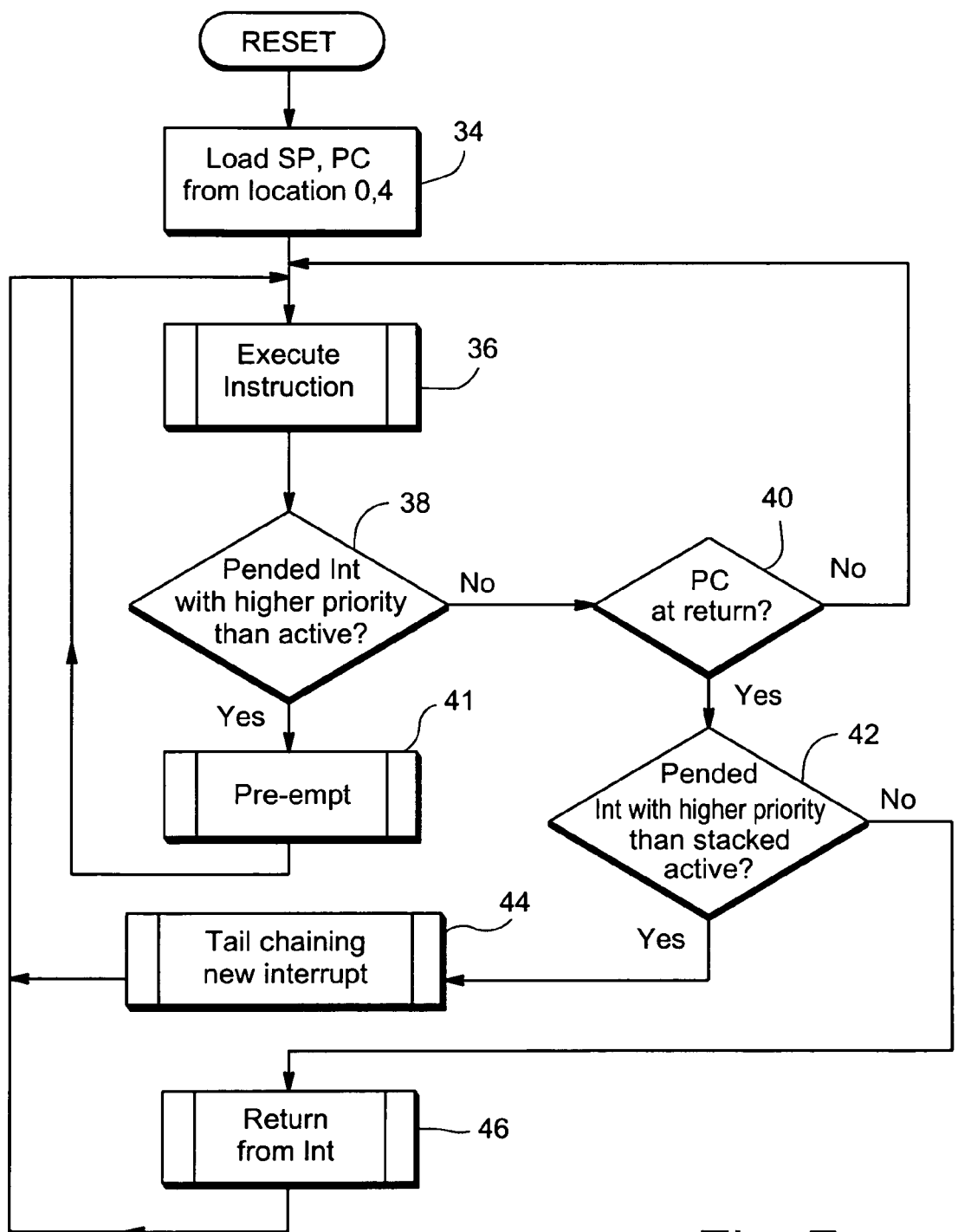
FIG. 7 is a flow diagram schematically illustrating an alternative main control flow for interrupt driven processing within the system of FIG. 1 (not including an illustration of the handling of a late arriving interrupt)

FIG. 7 schematically illustrates an alternative flow of the main interrupt control when tail chaining is supported as described below. It will be appreciated that different embodiments of the present technique need not provide the tail chaining technique described below and in particular in relation to FIGS. 7 and 10. When the system emerges from reset, reset handling hardware controls reset processing at step 34. Upon exit from the reset handling, a normal user program is started and execution of instructions proceeds at step 36. During this instruction execution, step 38 serves to detect whether there are any pending interrupts that have been detected by the nested vector interrupt controller 24 and marked as pending within the control table 26 that have a higher priority than any existing interrupt processing which is taking place. If no such pended interrupts with a higher priority are present, then processing proceeds to step 40 at which a check is made to see if the program counter value is at a return address corresponding to a predetermined special purpose return address, such as a top of memory location. If such a return address is not detected, then processing returns to step 36 for execution of the next instruction. Alternatively, a special return from interrupt instruction could be placed at the end of the interrupt handling program.

If the determination at step 38 was that there is a pending interrupt with a higher priority than the current processing, whether that be an interrupt itself or the user processing, then step 41 serves to trigger a pre-emption operation as will be described further below. After this pre-emption operation, processing returns to step 36 where the first instruction within the interrupt handling program which has caused the pre-emption is executed.

If the determination at step 40 was that the program counter had the predetermined return address value indicating an end of interrupt processing, then step 42 serves to detect whether there is a pending interrupt with a higher priority value then the currently stacked active interrupts or user processing. If such a pending interrupt is present, then processing proceeds to step 44 in which a tail chaining operation to that pending interrupt is performed without a save operation as will be discussed further later. After this tail chaining operation at step 44, a return is made to step 36 at which the first instruction in the newly activated interrupt will be executed.

If the determination at step 42 was that there was no pending interrupt with a higher priority than the processing which is stacked and active, then step 46 serves to perform a return from interrupt operation as will be described further below before processing is returned to step 36 where that preempted processing is resumed.

Figure 8:
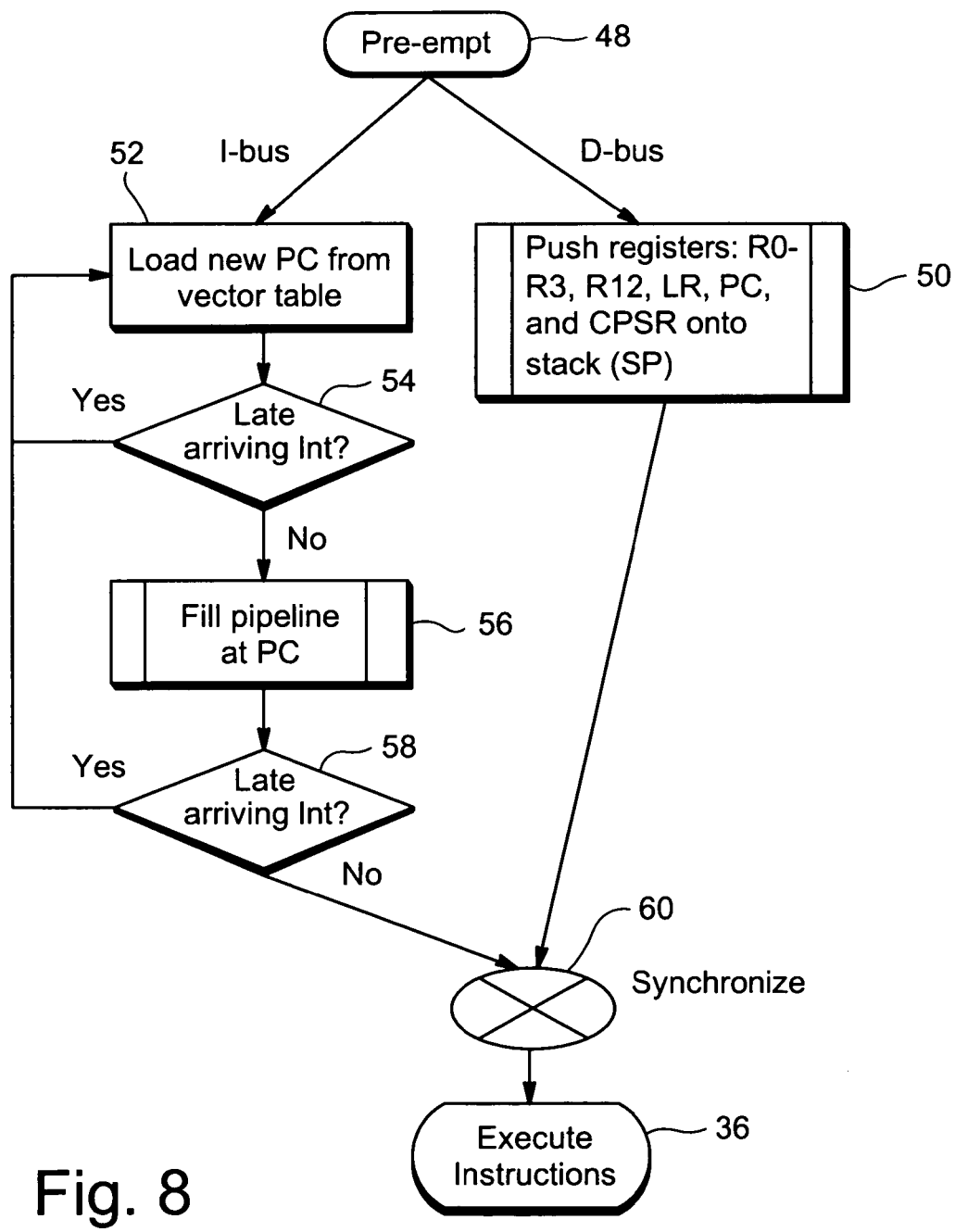
FIG. 8 is a flow diagram schematically illustrating pre-emption flow control.

FIG. 8 schematically illustrates the processing performed during preemption. When pre-emption is started at step 48, parallel instruction side and data side hardware controlled operations are initiated. On the data side, the state data to be stored is pushed to the stack memory 30 at step 50. This pushing of the various register values takes a number of processing cycles to complete. In parallel with the data side operations, the instruction side serves at step 52 to read a new program counter value for the target interrupt handling program from the vector table of the processor associated with the interrupt which has triggered the preemption. Step 54 then serves to check for any late arriving interrupt signal generated by the nested vector interrupt 24 indicating that a new interrupt event has been detected which has a higher priority than the interrupt event which triggered the initial pre-emption started at step 48. If such a late arriving interrupt signal is detected, then processing is returned to step 52, where the new program counter value associated with the late arriving interrupt is read from the vector table such that the appropriate interrupt handling code can start to be read from the memory and be fed to the instruction pipeline 20. If there is no late arriving interrupt signal detected at step 54, then step 56 serves to start to fill the instruction pipeline 20 with the interrupt handling code. When this interrupt handling code has been loaded into the pipeline, then a further step at step 58 is made to determine again whether any late arriving interrupt signal has occurred and if so to return to step 52 such that the late arriving interrupt can be serviced. It will be appreciated that the check for the late arriving interrupt is illustrated in FIG. 6 as occurring at steps 54 and 58 surrounding the pipeline filling step 56, but in practice the late arriving interrupt check may be continuously performed in parallel with the pipeline filling operation.

When both the instruction side pipeline filling and the data side state data storage have completed (as shown with a synchroniser at step 60), processing then proceeds to execute instructions at step 36 as shown. This parallel operation increases speed and allows for late arriving interrupts to be accommodated by restarting the pipeline refill.

Figure 9:
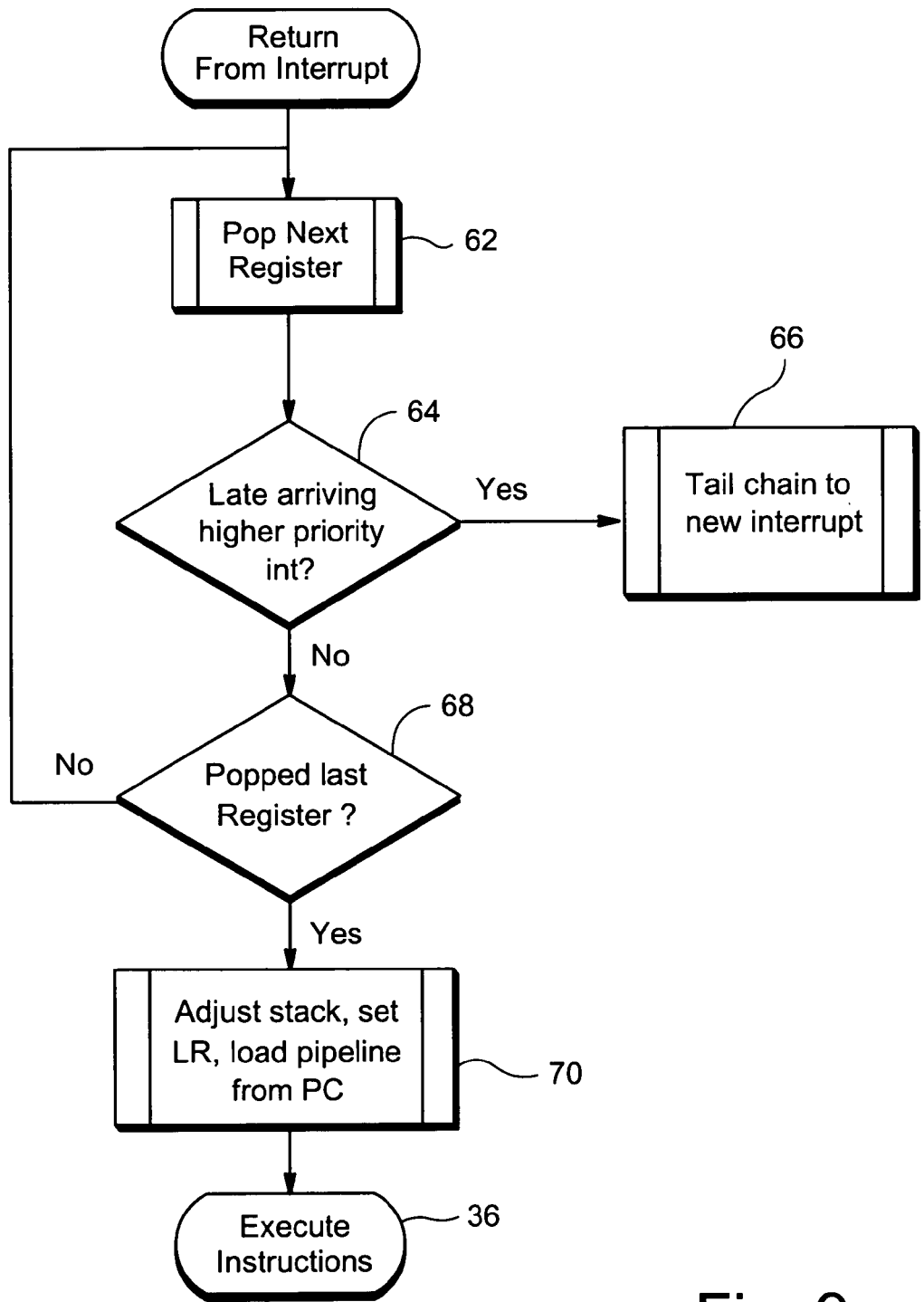
FIG. 9 is a flow diagram schematically illustrating return from interrupt flow control.

FIG. 9 schematically illustrates a return from interrupt processing flow. When the return from interrupt has been initiated, the nested vector interrupt controller 24 acts at step 62 to retrieve the state data from the stack memory 30. At step 64 a check is made for a late arriving interrupt with a higher priority than the interrupt or processing to which a return is being made. If such a high priority interrupt is detected, then a tail chaining operation is initiated at step 66 and any appropriate repairs necessary to the saved data on the stack memory 30, stack pointer or restored registers are made.

If no late arriving higher priority interrupt is detected at step 64, then step 68 serves to detect the restoring of the last of the state data for the interrupt or processing being returned to and when this is complete, processing is passed to step 70 where the stack pointer is adjusted and the link register and pipeline are reloaded before execution of instructions is resumed at step 36.

If the system is an interrupt-only system, then return from interrupt when there are no pending interrupts can be used by the hardware to trigger entry into a low power consumption sleep mode in which processing is halted awaiting detection of the next interrupt event.

Figure 10:
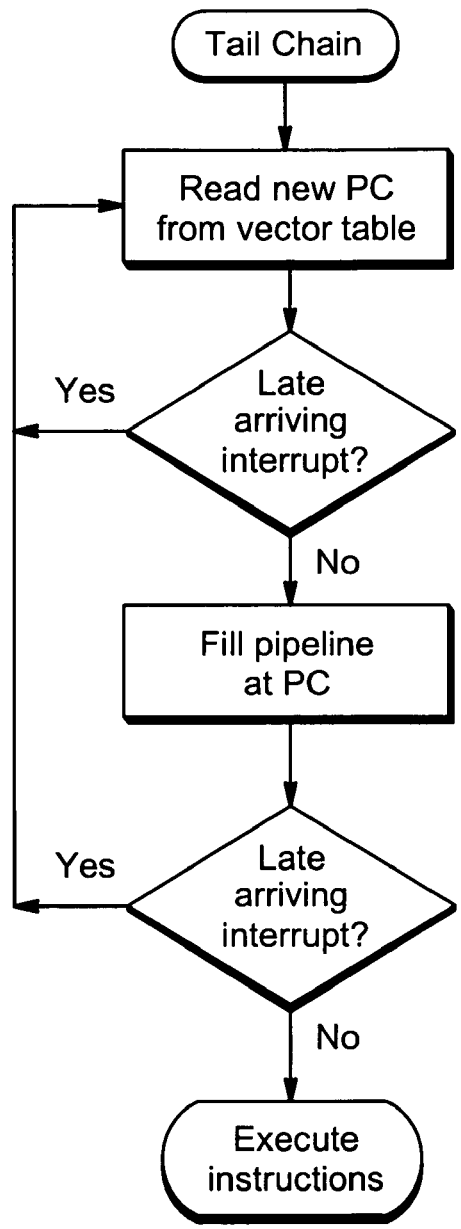
FIG. 10 is a flow diagram schematically illustrating flow control when processing of one interrupt directly follows processing of another interrupt.

FIG. 10 schematically illustrates the tail chaining processing flow. This processing flow is the same as that illustrated in FIG. 6, except that in this example there is no need to save the state data at step 50 since tail chaining occurs when one interrupt handling program has completed and another is to be started without a return to any previous state being made. Accordingly, there is no state associated with the terminating interrupt handling program that needs to be saved. The time taken to save state data upon entering an interrupt is normally a limiting factor since the reloading of the instruction pipeline 20 with the interrupt handling code to be executed is normally quicker. Thus, the tail chaining technique can speed interrupt response in circumstances where one episode of interrupt handling immediately follows another.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data, said apparatus comprising:
    processing logic operable to perform processing operations under control of program instructions and subject to interruption by a plurality of interrupt handling programs; and
    a nested interrupt controller operable to control execution of said plurality of interrupt handling programs in response to priority level values associated with respective ones of said plurality of interrupt handling programs, each priority level value being divided into a first portion and a second portion; wherein
    said nested interrupt controller is operative to compare a first portion of a priority level value associated with a pending interrupt handling program with a corresponding first portion of a priority level associated with an active interrupt handling program to determine whether said pending interrupt handling program should pre-empt said active interrupt handling program or wait to be activated; and
    said nested interrupt controller is operative to order for activation a plurality of pending interrupt handling programs based upon a comparison of respective first portions of priority level values associated with said plurality of pending interrupt handling programs and then for any pending interrupt handling programs having equal respective first portions upon a comparison of respective second portions of said priority level values.

2. Apparatus as claimed in claim 1, wherein said first portions and said second portions are contiguous portions of said priority level values.

3. Apparatus as claimed in claim 1, wherein a boundary position between said first portions and said second portions within said priority level values is programmable such that different numbers of priority level values may be allocated to said first portions and to said second portions.

4. Apparatus as claimed in claim 1, wherein said first portions define a single group of interrupt handling programs and said second portions define relative ordering within said single group.

5. A method of processing data, said method comprising the steps of:
    performing processing operations under control of program instructions, said processing being subject to interruption by a plurality of interrupt handling programs; and
    controlling nested interrupt execution of said plurality of interrupt handling programs in response to priority level values associated with respective ones of said plurality of interrupt handling programs, each priority level value being divided into a first portion and a second portion; wherein
    said step of controlling compares a first portion of a priority level value associated with a pending interrupt handling program with a corresponding first portion of a priority level associated with an active interrupt handling program to determine whether said pending interrupt handling program should pre-empt said active interrupt handling program or wait to be activated; and
    said step of controlling orders for activation a plurality of pending interrupt handling programs based upon a comparison of respective first portions of priority level values associated with said plurality of pending interrupt handling programs and then for any pending interrupt handling programs having equal respective first portions upon a comparison of respective second portions of said priority level values.

6. A method as claimed in claim 5, wherein said first portions and said second portions are contiguous portions of said priority level values.

7. A method as claimed in claim 5, wherein a boundary position between said first portions and said second portions within said priority level values is programmable such that different numbers of said priority level values may be allocated to said first portions and to said second portions.

8. A method as claimed in claim 5, wherein said first portions define a single group of interrupt handling programs and said second portions define relative ordering within said single group.

9. Apparatus for processing data, comprising:
    means for performing processing operations under control of program instructions, said processing operations being subject to interruption by a plurality of interrupt handling programs; and means for controlling nested interrupt execution of said plurality of interrupt handling programs in response to priority level values associated with respective ones of said plurality of interrupt handling programs, each priority level value being divided into a first portion and a second portion;

means for comparing a first portion of a priority level value associated with a pending interrupt handling program with a corresponding first portion of a priority level associated with an active interrupt handling program to determine whether said pending interrupt handling program should pre-empt said active interrupt handling program or wait to be activated; and means for ordering for activation a plurality of pending interrupt handling programs based upon a comparison of respective first portions of priority level values associated with said plurality of pending interrupt handling programs and then for any pending interrupt handling programs having equal respective first portions upon a comparison of respective second portions of said priority level values.

10. Apparatus as claimed in claim 9, wherein said first portions and said second portions are contiguous portions of said priority level values.

11. Apparatus as claimed in claim 9, wherein a boundary position between said first portions and said second portions within said priority level values is programmable such that different numbers of priority level values may be allocated to said first portions and to said second portions.

12. Apparatus as claimed in claim 9, wherein said first portions define a single group of interrupt handling programs and said second portions define relative ordering within said single group.

* * * * *